United States Patent
Keller et al.

(10) Patent No.: US 8,533,948 B2
(45) Date of Patent: Sep. 17, 2013

(54) PROCESS FOR PRODUCING A ROTOR

(75) Inventors: Sorin Keller, Oberrohrdorf (CH); Andreas Hartmann, Schinznach-Dorf (CH)

(73) Assignee: ALSTOM Technology Ltd, Baden (CH)

( * ) Notice: Subject to any disclaimer, the term of this patent is extended or adjusted under 35 U.S.C. 154(b) by 403 days.

(21) Appl. No.: 12/780,516

(22) Filed: May 14, 2010

(65) Prior Publication Data

US 2010/0281688 A1  Nov. 11, 2010

Related U.S. Application Data

(63) Continuation of application No. PCT/EP2008/065080, filed on Nov. 6, 2008.

(30) Foreign Application Priority Data

Nov. 19, 2007  (DE) .......................... 10 2007 055 379

(51) Int. Cl.
*B21K 25/00* (2006.01)

(52) U.S. Cl.
USPC ......... 29/889.21; 29/889; 29/889.2; 148/539; 148/639; 228/231; 416/191; 416/213 R

(58) Field of Classification Search
USPC ................. 29/889.1–889.72; 228/160, 165, 228/231; 148/590, 639; 416/191, 213 R
See application file for complete search history.

(56) References Cited

U.S. PATENT DOCUMENTS

| | | | |
|---|---|---|---|
| 4,086,690 A | 5/1978 | Bernasconi | |
| 4,213,025 A | 7/1980 | Kuhnen | |
| 4,812,107 A * | 3/1989 | Barcella et al. | 416/191 |
| 5,189,279 A | 2/1993 | Foster et al. | |
| 5,414,929 A | 5/1995 | Floser et al. | |
| 5,532,454 A | 7/1996 | Kuhnen | |
| 6,152,697 A | 11/2000 | Konishi et al. | |
| 7,540,402 B2 * | 6/2009 | McCrink et al. | 228/231 |
| 2002/0081197 A1 | 6/2002 | Crawmer | |
| 2007/0187379 A1 | 8/2007 | Osuki et al. | |

FOREIGN PATENT DOCUMENTS

| | | |
|---|---|---|
| CH | 595011 A5 | 1/1978 |
| DE | 2026254 A1 | 1/1971 |
| DE | 2324388 A1 | 2/1974 |
| EP | 0604754 A1 | 7/1994 |
| EP | 0665079 A1 | 8/1995 |
| EP | 0665079 A1 | 5/2010 |
| GB | 2268100 A | 1/1994 |
| JP | 5273142 A | 6/1977 |
| JP | 53005045 A | 1/1978 |
| JP | 55027434 A | 2/1980 |
| JP | 6234671 A | 2/1987 |
| JP | 3133593 A | 6/1991 |

(Continued)

*Primary Examiner* — Richard Chang
(74) *Attorney, Agent, or Firm* — Volpe and Koenig, P.C.

(57) ABSTRACT

A process is provided for producing a rotor which is made by welding together disk-shaped and/or drum-shaped elements, in particular disks, wherein a device is used to join the disks together axially in sequence along a longitudinal axis and the disks are welded in a two-stage welding process. As they are joined together, the disks are stacked axially in the vertical direction. A first welding process takes place in a vertical orientation of the stacked disks, followed by a second welding process in a horizontal orientation of the stacked disks.

19 Claims, 9 Drawing Sheets

(56) References Cited

FOREIGN PATENT DOCUMENTS

| JP | 7171681 A | 7/1995 |
| JP | 7214308 A | 8/1995 |
| JP | 2003154454 A | 5/2003 |
| JP | 2004211187 A | 7/2004 |
| JP | 200645597 A | 2/2006 |
| JP | 2007278064 A | 10/2007 |

* cited by examiner

PROCESS FOR PRODUCING A ROTOR

CROSS REFERENCE TO RELATED APPLICATION

This application is a continuation of International Application No. PCT/EP2008/065080 filed Nov. 6, 2008, which claims priority to German Patent Application No. 10 2007 055 379.1 filed Nov. 19, 2007, the entire contents of all of which are incorporated by reference as if fully set forth.

FIELD OF INVENTION

The present invention relates to a process for producing a rotor, in particular a generator or turbine rotor for producing and/or converting kinetic and/or electrical energy.

BACKGROUND

It is known to produce rotors of large turbomachines of steam or gas turbines by welding individual, processed disks together to form a unit. The procedure which is conventional in the prior art for producing a rotor is described, for example, in CH 595 011. According to this document, the rotor is assembled by joining individual disks together in a stepwise manner. In this process, two disks to be joined are initially pressed against each other, heated and then welded together. Then, the further disks are mounted step-by-step by repeating the three steps mentioned until the entire rotor is complete. All of the steps are carried out in a common heating apparatus. EP 0 604 754 A1 discloses a process for producing a turbine rotor from individual, standardized rotor parts, which have been produced so as to be parallel in relation to each other to minimize the final production steps.

All production systems for producing rotors by the known process described above have to be designed for the size of the end product. It is very expensive to construct such large fabrication devices since these are at the boundaries of that which is physically feasible and can be constructed only with high technical outlay. In addition, large fabrication devices are technically unsuitable and financially uneconomical for the production of small rotors. This disadvantage is also described in EP 0 604 754 A1. In order to meet the needs of the fickle market, the highest possible flexibility is required.

DE 23 24 388 explains that the production of a high-quality root seam in the case of a vertical rotor axis requires complicated and expensive welding processes, and that technical difficulties may arise, in addition to the uncontrollability, when assembling large rotors vertically. A further disadvantage addressed in DE 23 24 388 is that the rotor has to be transferred in the warmed state from the vertical position into the horizontal position by known processes, in which all disks are assembled in sequence in the vertical position of the rotor and welded together by root seams. DE 23 24 388 mentions the aim of simplifying the technological process, increasing labor productivity and reducing capital investment. In DE 23 24 388, these objects are achieved by assembling and welding the rotor in the horizontal position, such that no rearrangement is required after the assembly operation.

CH 595 011 describes the use of the TIG (Tungsten Inert Gas) welding process for joining one disk to the next in the horizontal direction, and the performance of a submerged arc welding (SAW) process for filling the remaining grooves. In this case, one disk is joined to the other in a step-by-step manner, followed by preheating, prewelding and finish-welding, before the next disk is attached axially in the horizontal direction and the procedures are repeated. This document explains that the size of the heating box has to be extended to the new length of the disk stack for the finish-welding after each prewelding operation, or has to be adapted to the rotor length which increases step-by-step, since all production steps are carried out in a common apparatus. CH 595 011 discloses that two additional disks may in each case be preheated and prewelded so that in each case two grooves can then be filled simultaneously by the submerged arc welding process, since the submerged arc welding process lasts for a very long time. The size of the heating box could thus be expanded in each case by two elements in one go. At the end, after all the disks have been welded on in a step-by-step manner, the rotor is subjected to a stress relief annealing process and then ultrasonic testing.

SUMMARY

The present disclosure is directed to a process for producing a rotor, which is made by welding together disk-shaped and/or drum-shaped elements, in particular disks. A device is used to join the disks together axially in sequence along a longitudinal axis and the disks are welded in a two-stage welding process. The process includes stacking the disks axially in a vertical direction and carrying out a first welding process in a vertical orientation of the stacked disks. The process also includes carrying out a second welding process in a horizontal orientation of the stacked disks.

BRIEF DESCRIPTION OF THE DRAWINGS

The invention is explained in more detail below on the basis of exemplary embodiments in conjunction with the drawings, in which.

DETAILED DESCRIPTION OF THE PREFERRED EMBODIMENTS

Introduction to the Embodiments

Figure 1:
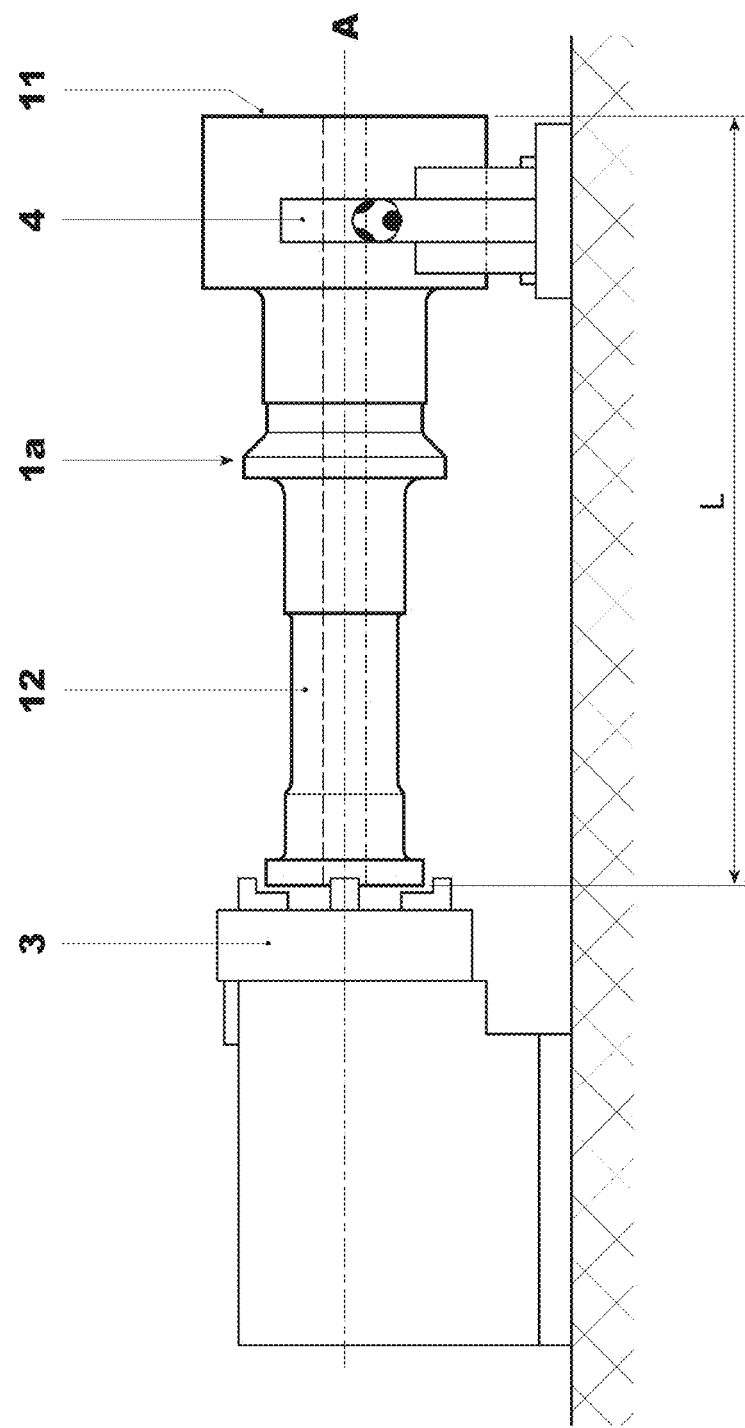
FIG. 1 is a schematic view of the first production step, or of the rough-turning of individual disks.

Accordingly, the invention is based on the object of developing a process for producing a rotor which overcomes the disadvantages of the prior art.

This object is achieved by the provision of a process for producing a rotor which is made by welding together disk-shaped and/or drum-shaped elements, in particular disks, wherein a device is used to join these disks together axially in sequence along a longitudinal axis A and these disks are welded in a two-stage welding process. According to a first embodiment of the present invention, the disks are stacked axially in the vertical direction. A first welding process then takes place in this vertical orientation of the stacked disks, followed by a second welding process, which preferably differs from the first welding process, in a horizontal orientation of the stacked disks.

Vertical orientation is to be understood as meaning that the longitudinal axis of a disk is oriented in the vertical direction, whereas horizontal orientation accordingly means the horizontal orientation of the longitudinal axis of the disk. The disks are therefore stacked on top of each other coaxially in the vertical direction.

A preferred embodiment is a process for producing a rotor which contains a two-stage process for welding together rotor elements, the different production steps being carried out in different orientations of the longitudinal axis of the rotor.

This production process makes it possible to construct rotors with larger dimensions, larger than monobloc shafts using the forging process. In contrast to the prior art, it is therefore only necessary for individual production systems to be designed for the larger rotor dimensions.

According to a further preferred embodiment, the first welding process, also known as prewelding, is a root welding process, particularly preferably a tungsten inert gas welding process, and the second welding process is a filler welding process, particularly preferably a submerged arc welding process, most preferably a twin-wire tandem narrow gap process. During the root welding process, the groove between two adjacent disks is substantially sealed merely in the depth, i.e. close to the central bore of the disks, such that the stack of disks can be tilted. Most of the groove remains unfilled after the prewelding. During the filler welding process, the groove is filled, this generally being done with the aid of additional material in the form of at least one welding wire.

After the second welding process and, if appropriate, a material-removing turning operation, the rotor is advantageously annealed and preferably additionally subjected to a quality testing operation. The quality testing operation can be carried out, for example, by ultrasound.

According to a further preferred embodiment, the disks are rough-turned in a horizontal position and are then stacked on top of each other in the vertical direction up to a predetermined size or length. It is preferred that only the first welding process is carried out while the longitudinal axis of the disks which have been joined together is still in a vertical orientation. The stacked disks, which are prewelded by the first welding process, are then tilted back into the horizontal position, and then the second welding process is carried out on the stacked disks, the longitudinal axis A of which is oriented horizontally.

The second welding process is preferably followed by tilting the prewelded, stacked disks back into the vertical position, and subjecting these disks, when their longitudinal axis is in a vertical orientation, to heat treatment, in particular a stress relief annealing process, the heat treatment preferably taking place in an annealing furnace or locally.

According to a further preferred embodiment of the present invention, after the heat treatment, the disks which have been welded to each other are tilted back into the horizontal position, and these disks, when their longitudinal axis is in a horizontal orientation, are preferably subjected, if appropriate, to a material-removing turning operation and preferably additionally a quality testing operation, in particular by ultrasound.

In a further preferred embodiment of the present invention, the rotor is subjected to local heat treatment, particularly preferably a local stress relief annealing process, after it has been made by welding together stacked disks, only weld seams which are produced during the welding process being annealed, wherein use is made, in particular, of inductive elements and/or resistance elements. This makes it possible to avoid the use of a large heating chamber, and this can result in reduced costs during the production process.

A quality assurance operation can additionally be carried out by ultrasound on the rotor in a last production step, preferably only at local sites, particularly preferably only at weld seams. This means that it is not necessary to use an annealing furnace adapted to the size of the entire rotor. This likewise makes it possible to reduce costs.

According to a next preferred embodiment, at least one auxiliary wire is used during the first welding process and/or during the second welding process. This additional material, which is in the form of welding wire, can be drawn from the base material of the rotor or of the disks or of the forged elements. This homogeneity is particularly advantageous. The base material and/or the material of the welding wire is preferably a "low-alloy, heat-resistant, superclean NiCrMo grade".

As already mentioned in the introduction, the process according to the disclosure has the advantage that not all of the production machines have to be so large that they can receive the entire length of the rotor. According to a further preferred embodiment, a substantially vertically oriented production system and a substantially horizontally oriented production system are suitable for receiving the overall length of a rotor. The other production systems can be smaller.

According to a particularly preferred embodiment of the present invention, the rotor is made by welding together two rotor halves which are prefabricated from disks. According to a further preferred embodiment, preferably at least two, preferably three to ten, particularly preferably five to seven disks are joined together to form a rotor half. The disks are preferably stacked on top of each other in a vertical orientation until a predetermined length of a rotor half is reached. The rotor halves assembled in this way are preferably produced by the process as claimed in one of claims 1-7. In this case, each rotor half has a base and a body, the base of a first rotor half being welded to the root of a second rotor half.

The rotor is preferably made by welding the two prefabricated rotor halves together in a two-stage welding process. In this case, it is advantageous if the first welding process is carried out when the longitudinal axis of the rotor half is in a vertical orientation, and the second welding process is carried out when the longitudinal axis of the rotor half is in a horizontal orientation. The two rotor halves are joined together by advantageously first carrying out a root welding process, preferably a tungsten inert gas welding process, and then a filler welding process, preferably a submerged arc welding process.

In a further preferred embodiment of the invention, in which two rotor halves are welded together to form a rotor, the rotor, which is assembled from two rotor halves, is prewelded in a vertical orientation in a first welding process, in that the prewelded rotor is tilted into the horizontal position and subsequently processed in a horizontal orientation in a second welding process. The rotor is then tilted back into the vertical position, the rotor being subjected, in the vertical orientation, to a stress relief annealing process, preferably only at local sites, particularly preferably only at welded sites. Before the heat treatment, the rotor may additionally be subjected, if appropriate, to a material-removing turning operation, it being possible for this to be carried out either in a horizontal or in a vertical position of the rotor, depending on the orientation of the corresponding machine.

According to a particularly preferred embodiment of the invention, a rotor comprises two rotor halves of equal length. However, it is also possible for the rotor to be assembled from two rotor halves of differing lengths, i.e. these rotor halves are assembled, for example, from a different number of disks.

The multi-stage production process according to the invention is directed, in particular, to the production of a rotor which comprises prefabricated rotor halves. A rotor half is preferably produced by welding individual rough-turned and processed disks together, this taking place step-by-step at the same time as the production of other rotor halves. The processing steps of rough-turning and assembly of the individual disks to form rotor halves, prewelding, finish-welding and heat treatment for each rotor half are preferably to be fully completed before these prefabricated rotor halves are welded together to form a rotor. Each rotor half is preferably preprocessed completely before the two halves are welded together to form a rotor unit, and the rotor is subsequently processed as a whole only at the end of the production process.

The use of additional material, such as auxiliary wire, is advantageous both during the first welding process, which is preferably a root welding process, particularly preferably a TIG welding process, and during the second welding process, which is preferably a filler welding process, particularly preferably a submerged arc welding process. This welding wire advantageously consists of the same material as the individual forged parts, for example the disks. The wire can therefore be drawn from the base material of the rotor elements or of the elements of the welded generator. It is particularly preferred if the base material is a so-called "low-alloy, heat-resistant, superclean NiCrMo grade".

DETAILED DESCRIPTION

FIG. 1 is a schematic view of the first production step, in which a first part or an individual disk is rough-turned. A disk is understood to mean an axial segment of the rotor 2 in relation to the longitudinal axis A of the rotor 2, where the axial length of the disk may also be greater than the diameter thereof, such that it is also entirely possible for the disk to be a drum-shaped rotor element. The disk preferably has a central bore. A disk of this type is clamped substantially horizontally into a machine for the purpose of rough-turning in the axial direction in relation to the longitudinal axis A of said disk, the clamping preferably being effected between two clamping jaws. While it is clamped in the relevant machine, the disk is preferably freely rotatable about its longitudinal axis A.

Figure 2:
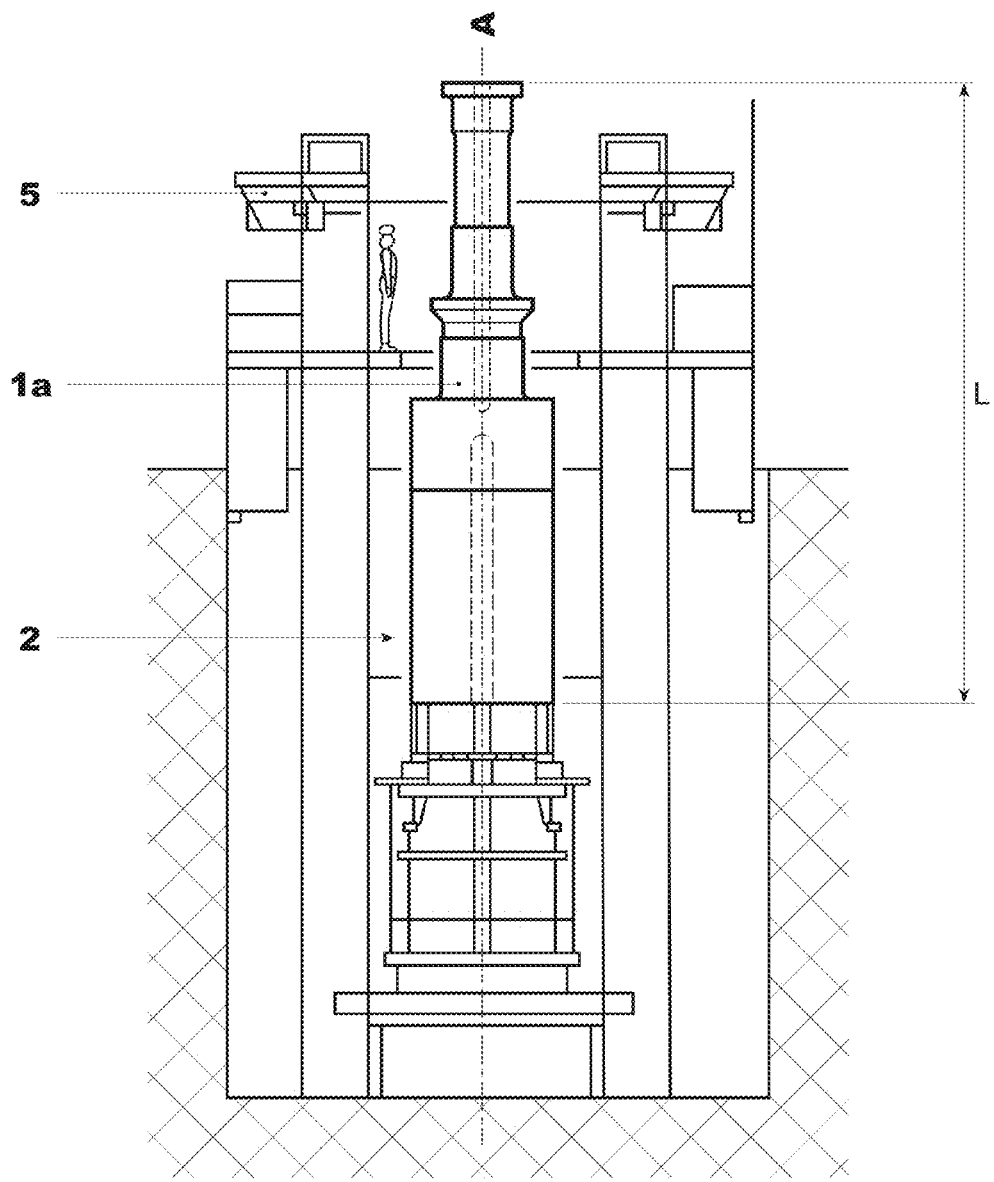
FIG. 2 is a schematic view of the second and third production steps, or of the construction of a rotor half from individual disks, and of the first welding process, in which a rotor half is prewelded by the TIG welding process.

FIG. 2 is a schematic view of the second and third production steps, or of the construction of a rotor half 1a from individual disks, and of the first welding process. Contrary to the recommendation in DE 23 24 388, the rough-turned disks are firstly stacked on top of each other axially in a substantially vertical position in relation to the longitudinal axis A of a disk. The number of disks which have been joined together varies depending on the size of the rotor. At least two, preferably three to about ten disks, particularly preferably five to seven disks are generally placed on top of each other, and these then together form a rotor half. The individual disks are generally stacked in the manner of a pyramid in the vertical direction. The disks may have different diameters. The lowermost disk of the stack of disks is preferably that disk which has the largest outside diameter. In order to illustrate the rotor dimensions, a person is shown at the top on the left-hand side in FIG. 2. It can be derived from the figure that a rotor half 1a, as is shown here, is roughly five times the size of an adult. If it is assumed that the average adult is about 1.60-1.80 m tall, the axial length of a rotor half 1a, 1b amounts to about eight to nine meters. However, depending on how many disks are joined together and depending on the size of the machine to be produced, the axial length of a rotor half 1a, 1b can be about two to twelve meters, preferably four to ten meters, particularly preferably about seven to nine meters. The length of the entire rotor 2 is then from four to 24 meters, preferably eight to 20 meters, particularly preferably 14-18 meters. In this context, a rotor half 1a, 1b is to be understood as meaning both an axial rotor portion which makes up 50% of the length of an entire rotor 2, and also a rotor portion which makes up a different proportion of an entire rotor 2. Therefore, it is not absolutely necessary that the rotor 2 is made by joining together two rotor halves 1a, 1b of equal length; instead, it is also possible for one rotor half 1a, 1b to have more or fewer disks than the other half.

An offset is arranged in the center of the cylindrical disks, i.e. the top side of a disk is provided with a central annular protrusion or a fastening lip, which is inserted into a corresponding central annular recess or groove on the bottom side of the following disk placed on top in the vertical direction. The top side of the following disk in turn is provided with an annular protrusion, which can be inserted into a corresponding annular recess on the bottom side of the next following disk placed on top in a vertical position in the axial direction. However, the disks can also be stacked via other stackable, corresponding structures between adjacent disks.

The depth of the groove which is to be welded between two adjacent stacked disks is generally about 100-500 mm, preferably 250-400 mm, particularly preferably about 300 mm, measured in the radial direction of the disk cylinder. The width of the groove in the axial direction is about 10-30 mm, preferably about 20 mm.

In a first welding process, the fastening lips of the individual disks, always in a substantially vertical position, are then welded together in the depth of the groove in a prewelding process. This first welding process, which corresponds to a root welding process, is preferably an automatic tungsten inert gas (TIG) welding process. The overlapping offset between two adjacent disks provides the weld material, preferably together with at least one welding wire as additional material. The welding process is carried out down to a peripheral remaining groove of about 10-30 mm, and the groove between two adjacent disks is filled with additional material except for a ring having a width of 9-15 mm. A wide peripheral groove thus remains substantially empty. Therefore, the prewelding serves substantially to prepare the "stack of disks" for the tilting operation into the horizontal position. The annular seam is substantially sealed around the central bore, such that the adjacent disks stick together provisionally in the depth of the groove between the individual disks, and therefore these disks can be tilted without the "stack of disks" falling apart.

During the tungsten inert gas (TIG) welding process, the arc used as the heat source burns between the non-fusible tungsten electrode and the workpiece. An inert shielding gas protects the melted weld material from the surrounding air. In the application of TIG welding according to the invention, solid wire made from the same material as the base material of the elements to be welded is supplied as additional material.

Figure 3:
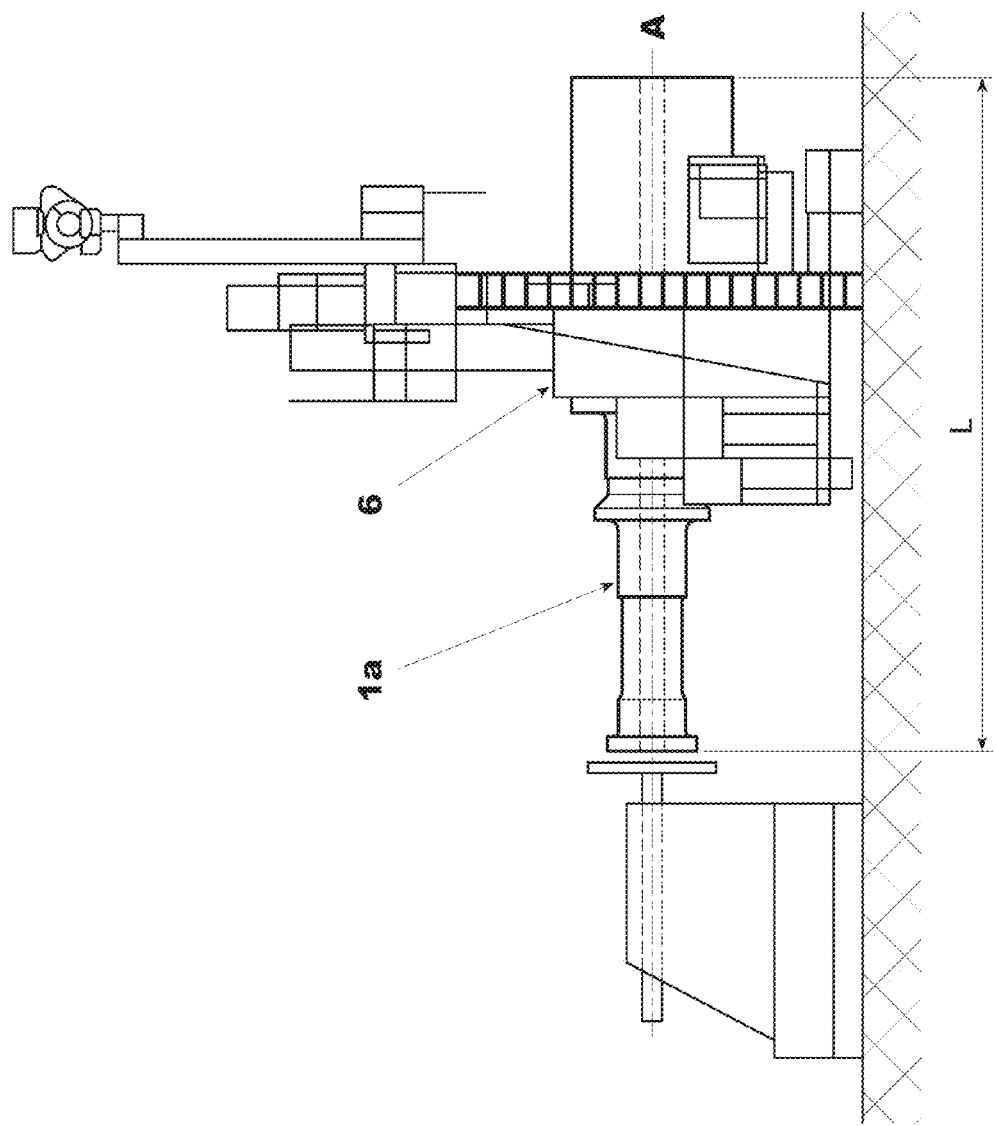
FIG. 3 is a schematic view of the fourth production step, or of the second welding process, in which a prewelded rotor half is subsequently processed by the submerged arc welding process.

In the fourth production step, shown schematically in FIG. 3, the rotor half which is preferably prewelded, as described above, by the TIG welding process is subsequently processed in a second welding process, corresponding to a filler welding process, preferably in a submerged arc welding (SAW) process. For this purpose, the prewelded rotor half is tilted from the vertical position into a substantially horizontal position. The annular groove or narrow gap groove or filler seam which remains after the TIG welding process is preferably filled under the control of a computer and preferably using an automated welding and seam positioning system for narrow gaps with two wires, i.e. a twin-wire tandem narrow gap welding process on AC current is preferably employed. These wires are preferably drawn from the same material as the base material, i.e. the material of the disks themselves.

The submerged arc welding (SAW) process is a fully mechanical arc welding process in which an arc burning under welding powder melts away the additional welding material. As a layer of slag, the melted powder protects the weld pool against the inlet of air and improves the quality of the weld seam. According to the present invention, the submerged arc welding process relates, in particular, to a twin-wire tandem welding process set up as a submerged arc narrow gap welding process. Major advantages of the submerged arc welding process are the fact that it is largely free from emissions, since the arc burns within the powder layer and only small quantities of gas are released, and also that it has a high degree of thermal efficiency and few fault sources.

Figure 4:
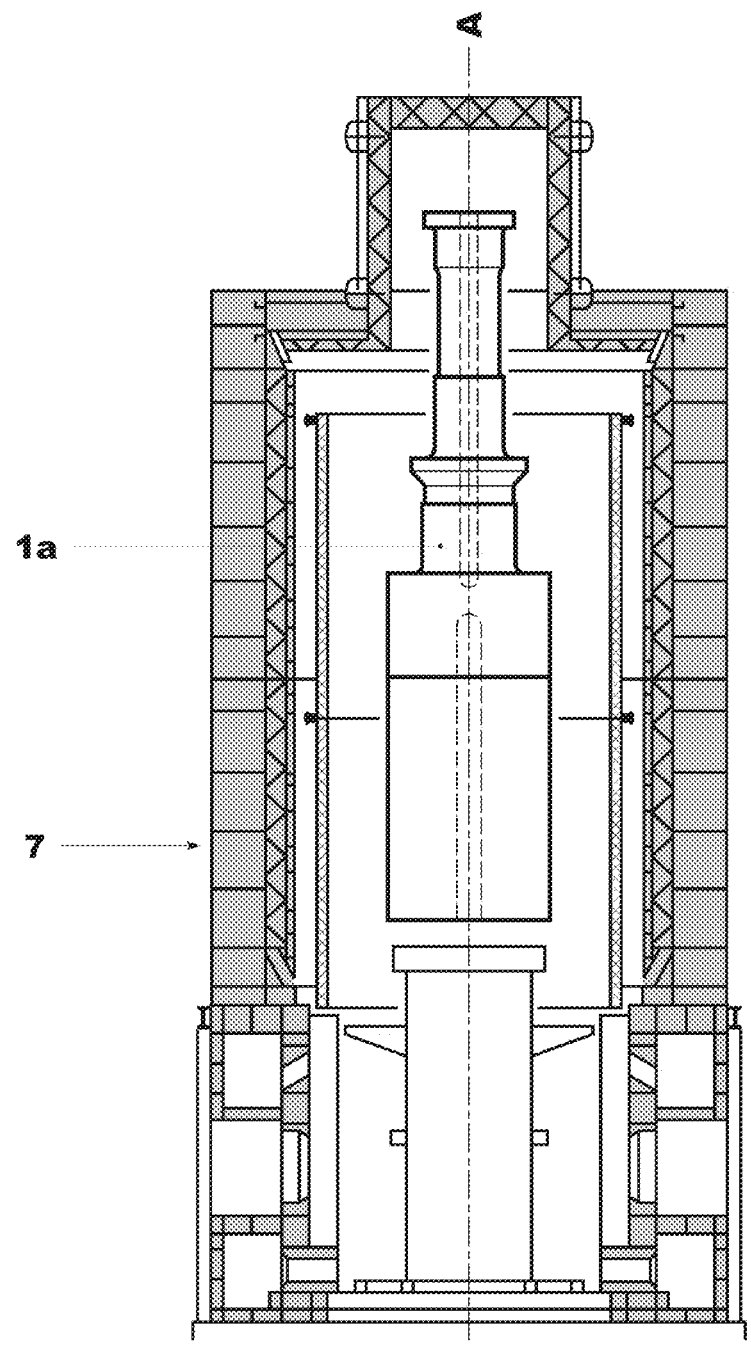
FIG. 4 is a schematic view of the fifth production step, or of the heat treatment of a prefabricated rotor half in a stress relief annealing furnace.

The finish-welded and, if appropriate, turned-away rotor half is then transferred back into the vertical position in order, in a fifth production step, to be subjected to heat treatment (post-welding heat treatment, PWHT), as shown schematically in FIG. 4. This preferably takes place in the form of stress relief annealing in an annealing furnace.

The stress relief annealing serves to reduce the internal stresses of a steel structure which are produced by the welding or by the subsequent irregular cooling. Without the stress relief annealing production step, internal stresses of this type would result in distortion-related geometric deviations or even fracture during further processing and/or subsequent heat treatment. During the stress relief annealing, other material properties such as strength and ductility are not significantly changed. The stress relief annealing is usually carried out in an annealing furnace in a temperature range of 500° C.-750° C., preferably 550° C.-650° C., the material starting to yield plastically according to the stresses. The annealing is followed by subsequent slow and controlled cooling in the furnace. The use of welding wires made from the same material as the disks themselves as additional material during the welding is associated with the advantage of the most homogeneous conditions possible during annealing.

Figure 5:
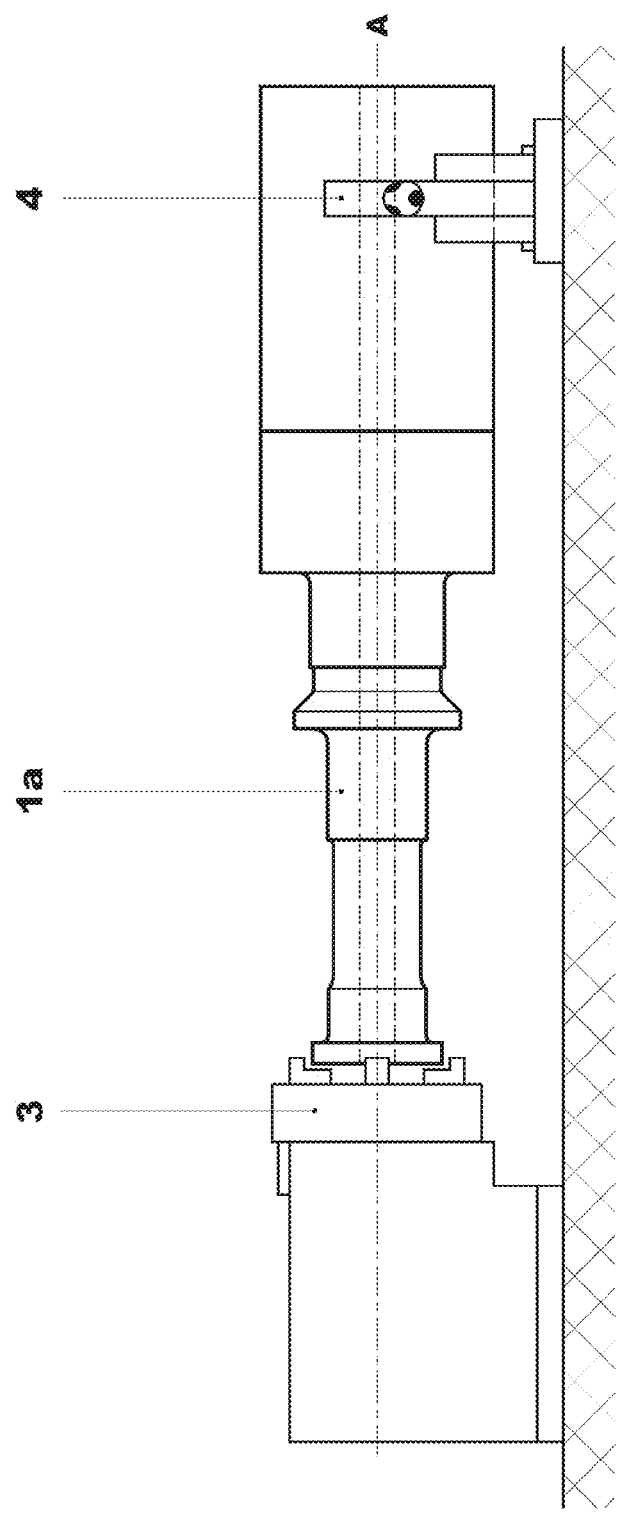
FIG. 5 is a schematic view of the sixth and seventh production steps, or of the finish-processing of a rotor half and the quality monitoring by ultrasound.

After this heat treatment, the finish-treated rotor half which has been completely prefabricated is tilted back into the horizontal position (see FIG. 5). In this horizontal position, the rotor half is subjected to possible finish-processing and quality monitoring by ultrasound (nondestructive testing, NDT inspections) (sixth and seventh production steps). The modular production of the rotor halves makes it possible to identify faults, which are determined here, specifically on the relevant rotor half, in good time, and to repair these faults.

The production steps described thus far are preferably carried out for each rotor half. In other words, the rotor halves can be prefabricated in this way in parallel processes, or each rotor half is fabricated according to the preceding production steps shown in FIGS. 1-5.

Figure 6:
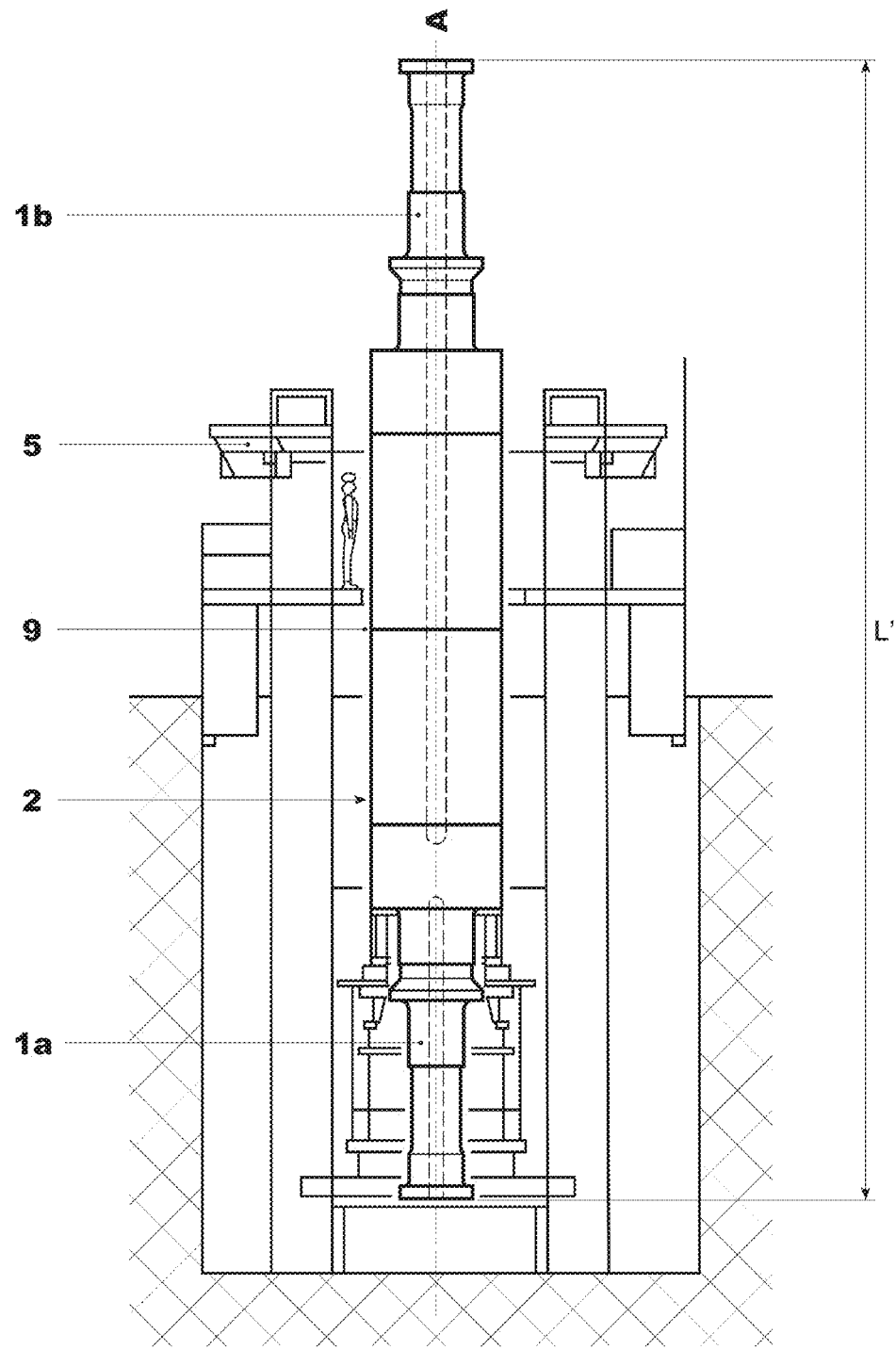
FIG. 6 is a schematic view of the eighth and ninth production steps, or of the assembly of two rotor halves to form a rotor and the prewelding at the contact surfaces of the two rotor halves.

FIG. 6 is a schematic view of the eighth production step, in which two prefabricated rotor halves are joined together. This production step is preferably carried out in the same system as the second and third processing steps, which are shown in FIG. 2. Here, the rotor halves are mounted on each other "back-to-back", i.e. the base of one rotor half touches the base of the second rotor half. The base is understood to mean the bottom side of the first disk which comes to lie right at the bottom in the stack of disks formed in the second production step.

In this vertical position, the groove between the contact surfaces between the two rotor halves is prewelded in a ninth processing step. As in the production of the rotor halves and as for the welding together of the stack of disks, this preferably takes place by an automatic TIG welding process.

Figure 7:
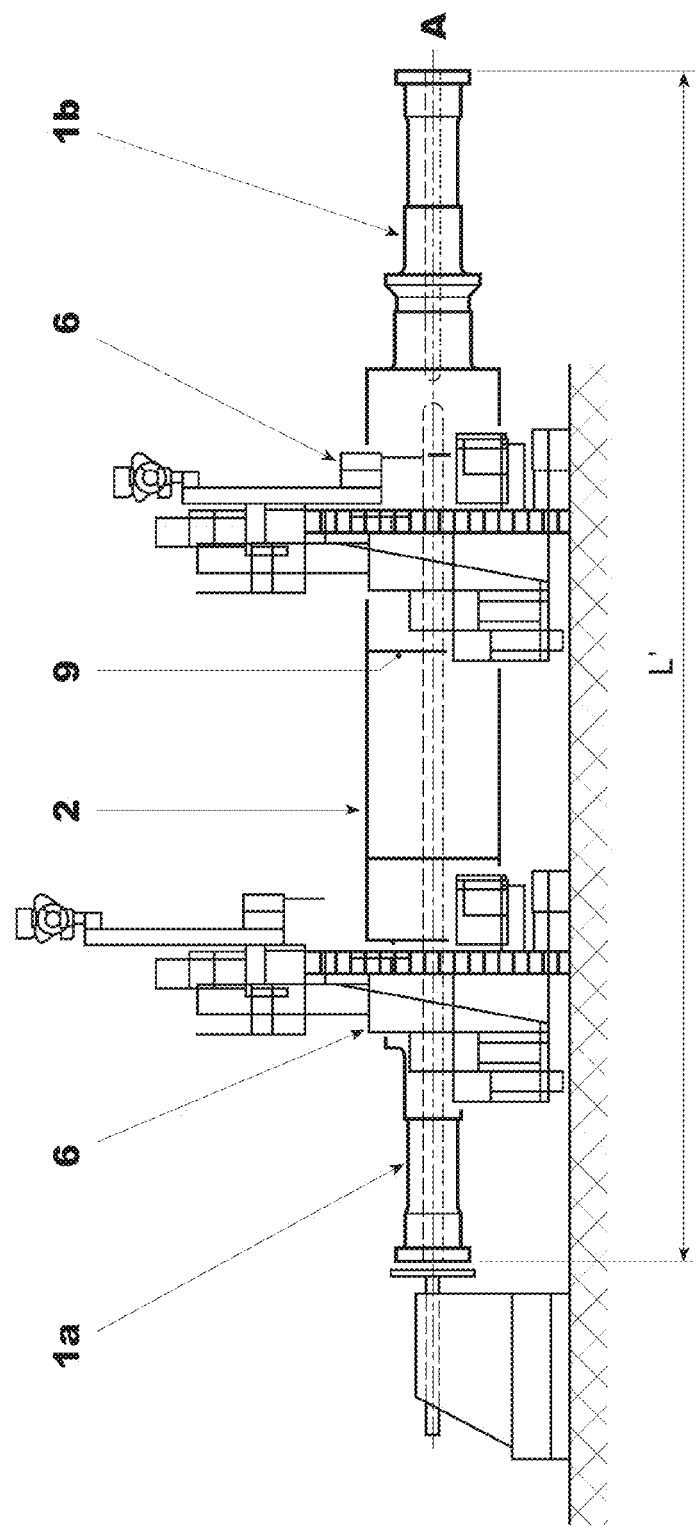
FIG. 7 is a schematic view of the tenth production step, or of the finish-welding of the rotor.

In order to carry out the next (tenth) production step, shown in FIG. 7, the rotor which has been made by joining two rotor halves together must be tilted back from a substantially vertical position into a substantially horizontal position. In the horizontal position, the rotor is then finish-welded in a renewed filler welding process, as described above. This last welding process preferably corresponds, in turn, to the second welding process when producing the individual rotor halves from individual disks, i.e. preferably in turn a submerged arc welding process.

Figure 8:
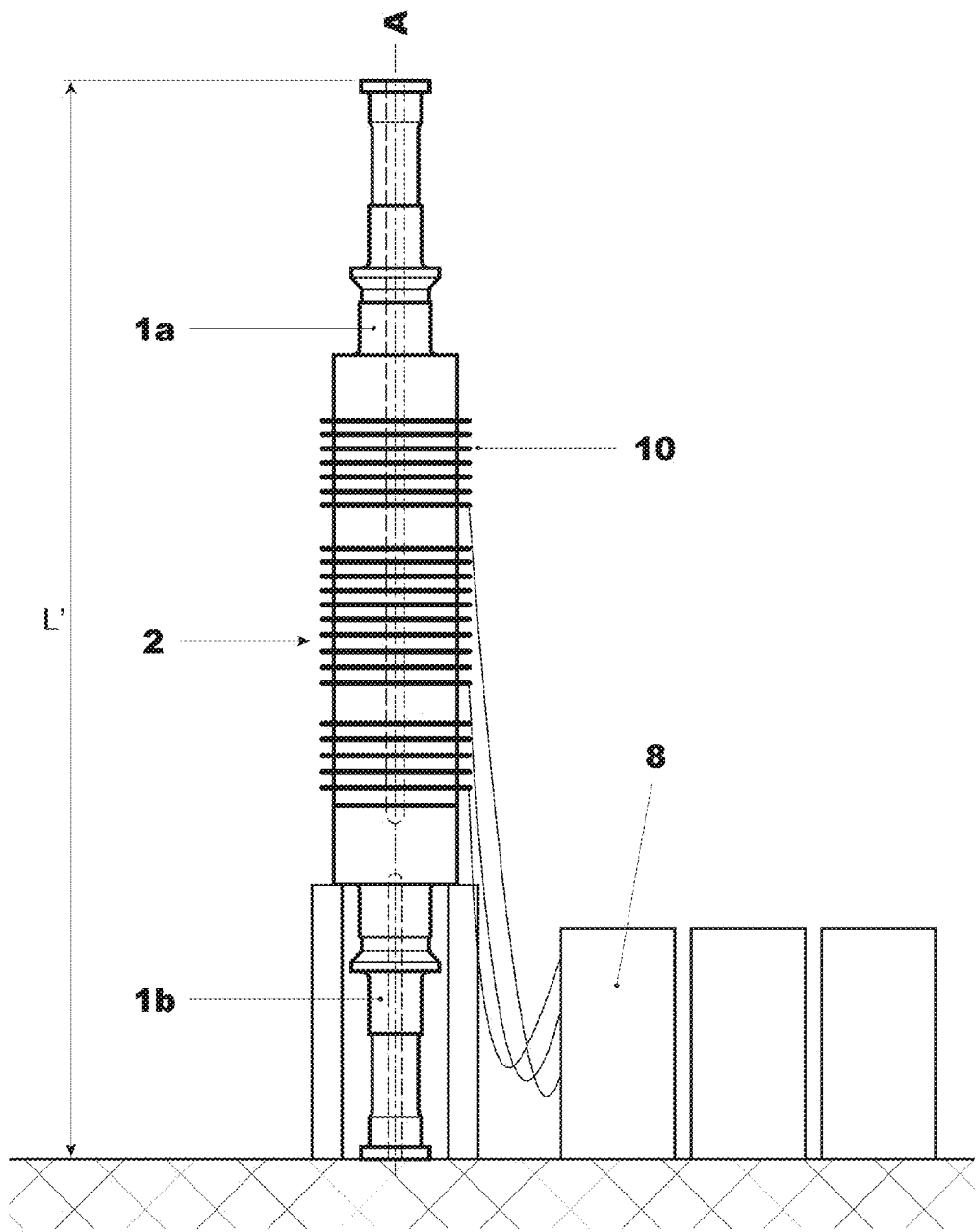
FIG. 8 is a schematic view of the eleventh and twelfth production steps, or of the local heat treatment of the rotor and the quality monitoring.
Figure 9:
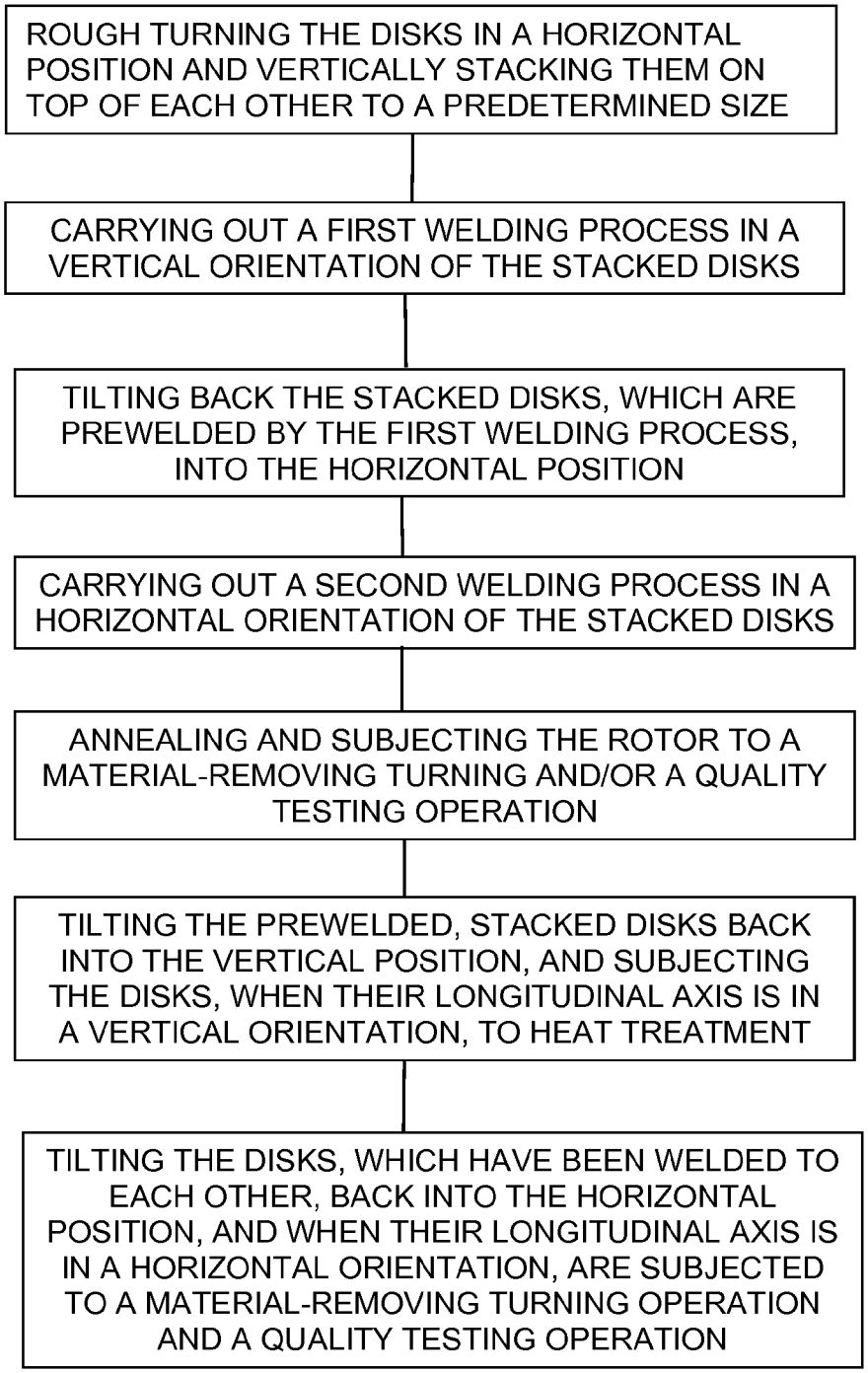
FIG. 9 is a flow diagram highlighting steps of an embodiment of the method of the present description.

As shown schematically in FIG. 8, the eleventh and twelfth production steps are finally carried out. Here, the rotor is exposed to local heat treatment specifically in its welded regions. The stress relief annealing process to be employed with preference is not carried out at this site, unlike in the heat treatment of the rotor halves, in an annealing furnace such that the entire workpiece is treated, but instead only at local sites of the rotor. This concentration of the stress relief annealing is achieved by inductive and resistance elements. This does not require a large heating box, as is required in the case of the conventional stress relief annealing process. Under certain circumstances, the heat treatment may be followed by a material-removing turning operation or finish-processing of the rotor.

In addition, the finished rotor is subjected to final quality monitoring (NDT inspections), which is preferably carried out by ultrasound.

What is claimed is:

1. A process for producing a rotor which is made by welding disks together, wherein a device is used to join the disks together axially in sequence along a longitudinal axis and the disks are welded in a two-stage welding process comprising:
   stacking the disks axially in a vertical direction,
   carrying out a first welding process in a vertical orientation of the stacked disks, and
   carrying out a second welding process in a horizontal orientation of the stacked disks, wherein the disks are rough-turned in a horizontal position and are then stacked on top of each other in the vertical direction up to a predetermined size, only the first welding process being carried out while a longitudinal axis of the disks which have been joined together is still in a vertical orientation, and the stacked disks, which are prewelded by the first welding process, are then tilted back into the horizontal position, and then the second welding process is carried out on the stacked disks, the longitudinal axis of which is oriented horizontally.

2. The process as claimed in claim 1, wherein the first welding process is a root welding process, and the second welding process is a filler welding process.

3. The process as claimed in claim 1, wherein after the second welding process, the rotor is annealed and subjected to a material-removing turning operation and/or a quality testing operation.

4. The process as claimed in claim 1, wherein the second welding process is followed by tilting the prewelded, stacked disks back into the vertical position, and subjecting the disks, when their longitudinal axis is in a vertical orientation, to heat treatment, in particular a stress relief annealing process, the heat treatment taking place in an annealing furnace or locally.

5. The process as claimed in claim 4, wherein, after the heat treatment, the disks which have been welded to each other are tilted back into the horizontal position, and the disks, when their longitudinal axis is in a horizontal orientation, are subjected to a material-removing turning operation and a quality testing operation.

6. The process as claimed in claim 1, wherein the second welding process is a twin-wire tandem narrow gap process.

7. The process as claimed in claim 1, wherein the rotor is subjected to a local stress relief annealing process after it has been made by welding together stacked disks, only weld seams which are produced during the two-stage welding process being annealed, wherein use is made of inductive elements and/or resistance elements.

8. The process as claimed in claim 1, wherein a quality assurance operation is carried out by ultrasound on the rotor in a last production step at local sites.

9. The process as claimed in claim 1, wherein at least one auxiliary wire which has been drawn from a base material of the rotor is used during the first welding process and/or during the second welding process, wherein the base material is a low-alloy, heat-resistant, superclean NiCrMo grade or a high-alloy 10-13% Cr grade, a low-alloy, heat-resistant CrMo grade or a low-alloy, heat-resistant CrMoV grade.

10. The process as claimed in claim 1, wherein a substantially vertically oriented production system and a substantially horizontally oriented production system are suitable for receiving the overall length of a rotor.

11. The process as claimed in claim 1, wherein at least two disks are joined together to form a rotor half.

12. The process as claimed in claim 11, wherein the at least two disks are stacked on top of each other in a vertical orientation until a predetermined length of a rotor half is reached.

13. The process as claimed in claim 11, wherein the rotor is made by welding together two rotor halves which are prefabricated from disks, each rotor half having a base and a body, and the base of the first rotor half is welded to the base of the second rotor half.

14. The process as claimed in claim 11, wherein the rotor is made by welding two prefabricated rotor halves together in a two-stage welding process, the first welding process being carried out when the longitudinal axis of the rotor half is in a vertical orientation, and the second welding process being carried out when the longitudinal axis of the rotor half is in a horizontal orientation.

15. The process as claimed in claim 11, wherein the two rotor halves are joined together by first carrying out a root welding process, and then a filler welding process.

16. The process as claimed in claim 11, wherein the rotor is prewelded in a vertical orientation in a first welding process, the prewelded rotor is tilted into the horizontal position and subsequently processed in a horizontal orientation in a second welding process and the rotor is then tilted back into the vertical position, the rotor being subjected, in the vertical orientation, to a stress relief annealing process at welded sites.

17. The process as claimed in claim 16, wherein the rotor is subjected to a material-removing turning operation in the vertical orientation.

18. The process of claim 1, wherein three to ten disks are joined together to form a rotor half.

19. The process as claimed in claim 1, wherein the rotor comprises two rotor halves of equal length.

\* \* \* \* \*